United States Patent [19]

Bösch

[11] 4,333,631
[45] Jun. 8, 1982

[54] PIPE VALVE ASSEMBLY WITH METAL VALVE SLIDE FOR HIGH VACUUM INSTALLATIONS

[75] Inventor: Hubert Bösch, Lustenau, Austria

[73] Assignee: Vat Aktiengesellschaft für Vakuum-Apparate-Technik, Haag, Switzerland

[21] Appl. No.: 207,425

[22] Filed: Nov. 17, 1980

[30] Foreign Application Priority Data

Nov. 24, 1979 [DE] Fed. Rep. of Germany ....... 2947517

[51] Int. Cl.³ .............................................. F16K 25/00
[52] U.S. Cl. .................................. 251/159; 251/172; 251/301
[58] Field of Search ................ 251/159, 171, 172, 301

[56] References Cited

U.S. PATENT DOCUMENTS

| | | | |
|---|---|---|---|
| 3,109,457 | 11/1963 | Oliveau | 251/172 X |
| 3,266,505 | 8/1966 | Kron | 251/159 X |
| 3,695,300 | 10/1972 | Bradel | 251/159 X |
| 3,842,861 | 10/1974 | Jandrasi | 251/172 X |

Primary Examiner—Harold W. Weakley
Attorney, Agent, or Firm—Toren, McGeady & Stanger

[57] ABSTRACT

A pipe valve assembly including a housing defining a flow aperture, a valve member for opening and closing the flow aperture, a spring biased valve seat ring for pressing the valve member to seal the aperture, a spring assembly urging the valve seat ring away from its sealing position and a fluid pressure chamber on one side of the spring assembly for receiving fluid pressure to actuate the valve seat ring into its sealing position. The spring assembly in formed with a smaller diameter annular spring member and a larger diameter annular spring member arranged coaxially relative to each other and relative to the valve seat ring with the valve seat ring being attached with an outer edge of the smaller diameter spring member and the inner edge of the larger diameter spring member. The spring assembly is supported in the housing at an inner edge of the smaller diameter spring member and at an outer edge of the larger diameter spring member.

4 Claims, 3 Drawing Figures

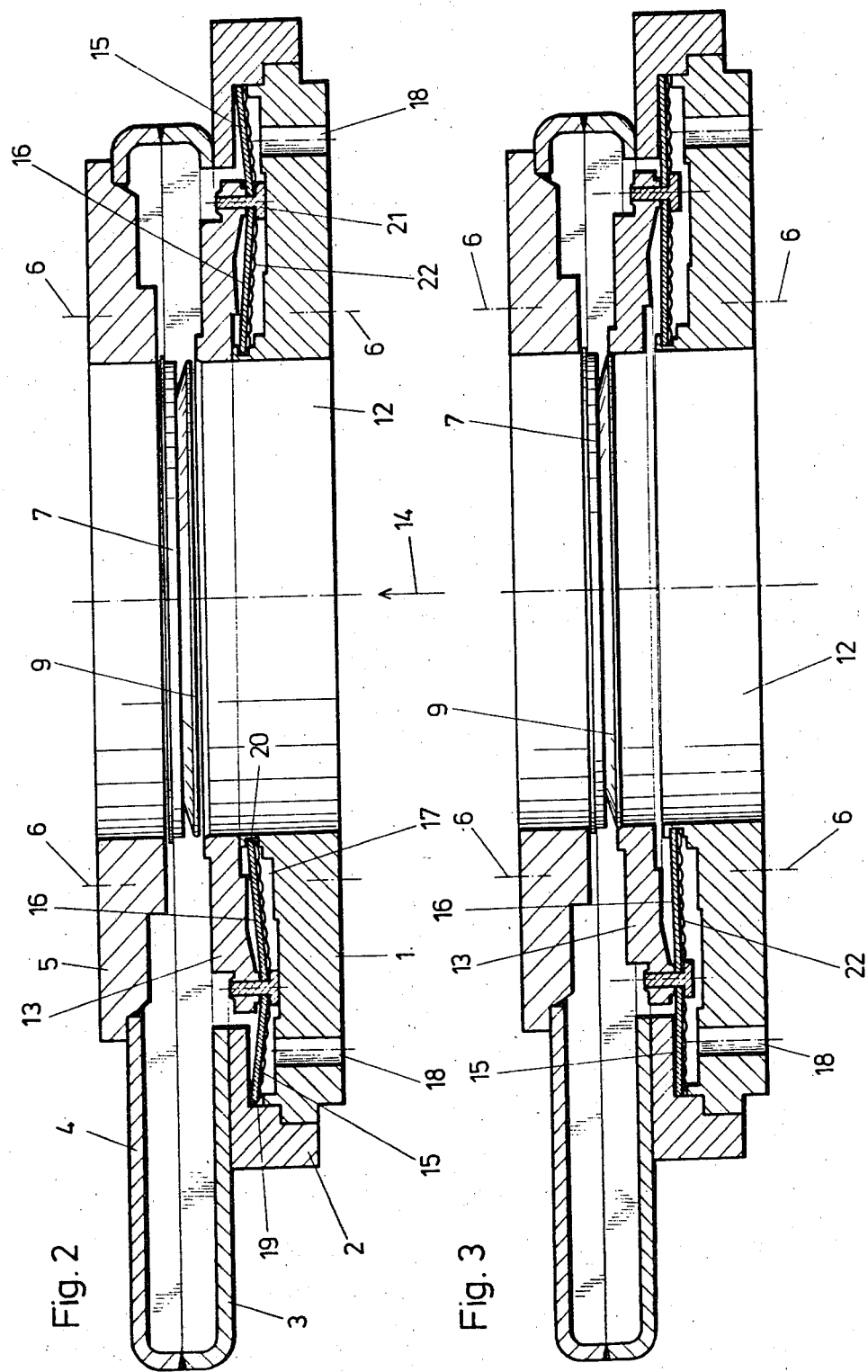

PIPE VALVE ASSEMBLY WITH METAL VALVE SLIDE FOR HIGH VACUUM INSTALLATIONS

The present invention relates generally to valve devices and, more particularly, to a valve assembly for opening and closing flow through a pipe, particularly an assembly including an all-metallic valve slide usable for high vacuum installations.

The device to which the present invention relates includes a housing with a valve flap adjustably arranged in the housing, wherein the valve flap is moved within its own plane between positions opening and closing a flow aperture of the valve assemble. In order to effect a tight closure of the valve assembly, a valve seat ring is provided coaxially with the flow aperture with the valve seat ring being axially adjustable to be pressed against the valve flap. Return movement of the valve seat ring is effected by means of a spring force and both the valve seat ring and the valve flap are arranged with sealing elements in operative connection with each other at their insides and at their edges.

Pipe closers of this type are known in the art and in order to effect axial adjustment of the valve seat ring there are provided coaxially arranged, essentially cylindrical metal bellows which define an annular chamber and into which a pressure medium may be introduced. When the pressure medium is admitted to the metal bellows, they will expand in the axial direction and thereby cause displacement of the valve sealing ring which is tightly connected with the bellows. Additional restoring springs must be arranged for returning the valve sealing ring when opening the valve slide. Since substantial force is required for applying the necessary valve closing pressure and since these forces must also overcome the force of the restoring springs, structures in accordance with the prior art require strong metal bellows which, in turn, require substantial space to accommodate the metal bellows.

It is accordingly intended to provide by the present invention a pipe closing assembly of the type described with a structure for the adjusting mechanism of the valve seat ring which will require less space in order to maintain the axial structural length of the pipe closer, especially the valve slide, as short as possible.

SUMMARY OF THE INVENTION

Briefly, the present invention may be described as a pipe valve or closer assembly, particularly for controlling flow in pipes in high vacuum installations, comprising a housing defining a flow aperture, a valve member adapted to be moved between a first position for closing the aperture and a second position for opening the aperture, a valve seat ring arranged coaxially with the aperture and adapted to be moved axially relative thereto into a sealing position to press the valve member against the housing in order to seal the aperture when the valve member is in the first position, spring means engaging the valve seat member to urge the valve seat ring away from the sealing position, and fluid pressure means including means defining together with the spring means a fluid pressure chamber on one side of the spring means for urging the valve seat ring into the sealing position. The spring means is comprised of a smaller diameter annular spring member and a larger diameter annular spring member arranged coaxially relative to each other and relative to the valve seat ring. The valve seat ring is attached with an outer edge of the smaller diameter spring member and the inner edge of the larger diameter spring member with the spring means being supported in the housing at an inner edge of the smaller diameter spring member and at an outer edge of the larger diameter spring member.

Thus, in accordance with the present invention, the outer edge of the valve seat ring is connected with at least two cupped springs (Belleville springs) of different diameters with the cupped springs being arranged with opposite orientations but coaxially relative to the valve seat ring. The spring means is formed as an annular member composed of these two cupped springs and it will form itself in a V-shaped configuration having its apex facing away from the valve seat ring when the valve seat ring is not in the sealing position. The annular spring member forms, with its side facing away from the valve seat ring together with the housing, a chamber to which the pressure medium can be admitted. The annular spring member is supported with its edges on the housing and the vertex of the V-shaped configuration of the annular member projects into the fluid pressure chamber.

As a result of the configuration in accordance with the invention, the pipe closer valve assembly may be constructed with a very short length and it is capable of meeting requirements which are continuously encountered in the design of pipe closers of this type.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 2 is a cross sectional view of the valve assembly taken along the line A—A in FIG. 1 showing the valve flap swung into the aperture closing position but not yet pressed into sealing position for tight closure of the valve; and FIG. 3 is a sectional view also taken along the line A—A of FIG. 1 showing the valve flap in the aperture closing position and with the valve flap tightly pressed into sealing engagement.

DETAILED DESCRIPTION OF THE PREFERRED EMBODIMENT

Figure 1:
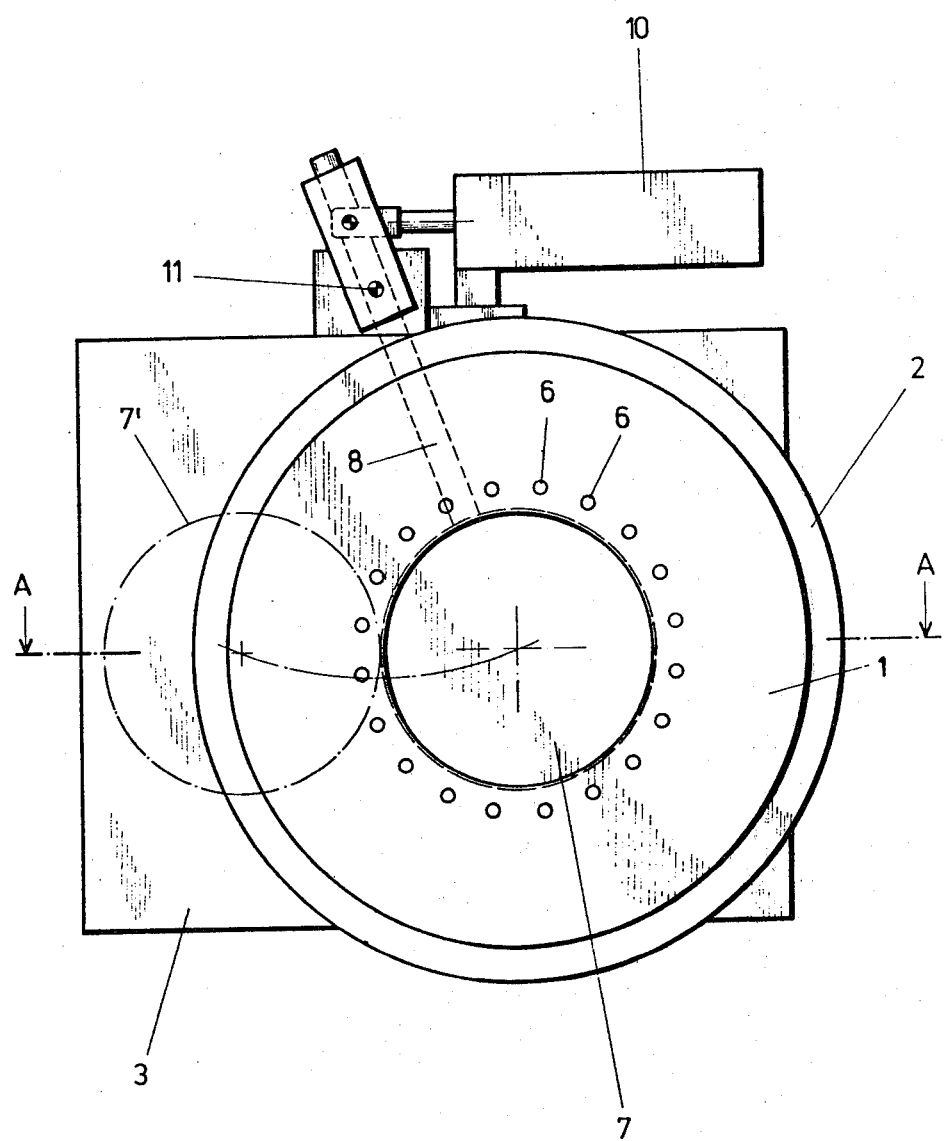
FIG. 1 is a plan view of a valve assembly including a valve slide for a high vacuum installation.

As depicted in the drawings, the valve assembly of the invention is formed with a valve housing which is composed of housing components 1, 2, 3, 4, and 5 defining therethrough a valve opening or flow aperture 12. Advantageously, these components of the housing may be joined together by welding and the housing components 1 and 5 at the end face of the valve are provided with suitable means for enabling connection thereto of flanges of pipelines through which flow is to be controlled by the valve assembly of the invention. These attachment means are shown as a ring of threaded bores 6 which are indicated in the sectional views of FIGS. 2 and 3 by appropriate center lines only.

The valve assembly of the invention includes a valve flap or valve member 7 which includes sealing ledges or lips 9 arranged on the rim of the valve flap. The valve flap 7 is fastened with a support rod 8 which projects through the valve housing and which is sealed relative to the housing. The support rod 8 is arranged to be pivoted about a pivot axis 11 by means of a piston-cylinder unit 10.

By swinging movement of the valve flap 7, it may be moved from a position out of the flow path defined through the opening 12 in order thereby to fully open the valve assembly, this position being shown in dash-dotted line form in FIG. 1 and identified as 7'. The valve flap 7 may also by moved into a position blocking flow through the opening 12 with this position shown in dashed line in FIG. 1 as well as in FIGS. 2 and 3.

Of course, instead of a swinging movement about a pivot axis such as the axis 11, it would also be possible to construct the valve flap 7 as a valve slide in such a way that it can be moved into the aforementioned positions by movement along a straight line.

In order to fully close and seal the opening 12 of the valve assembly, the valve flap 7 is first swung into the closing position, as shown in FIG. 2, and for effecting a fully sealed condition of the valve assembly, a valve seat ring 13 is pressed in an axial direction indicated by the arrow 14 in FIG. 2 against the valve flap 7 in a manner to be more fully described hereinafter.

The fully sealed condition of the valve assembly with the valve seat ring 13 pressed against the valve flap 7 is depicted in FIG. 3.

The valve seat ring 13 may be constructed of several components, for example, by constructing the sealing zone which is subject to high loads of a different material from the remaining portion of the valve seat ring. The outer edge of the valve seat ring 13 is connected with a pair of cupped springs (Belleville springs) 15, 16 having different diameters and arranged coaxially relative to each other and relative to the valve seat ring 13. Also, the springs 15, 16 are arranged with different orientations relative to each other. The cupped spring 16 is of a smaller diameter and is connected with the valve seat ring 13 at its outer edge. The cupped spring 15 is of a larger diameter and is connected with the ring 13 at its inner edge.

The two cupped springs 15, 16 form together an annular spring member having a V-shaped cross sectional configuration, best seen in FIG. 2. The aperture angle of the V-shaped cross sectional configuration may be close to 180 degrees, but it is preferably somewhat smaller than 180 degrees when no load is applied to this annular spring member. The annular spring member having the V-shaped cross sectional configuration, formed from the cupped springs 15 and 16, defines with its side facing away from the valve seat ring 13 the side of a fluid pressure chamber 17 to which a pressure medium may be introduced through one or several bores 18 leading from externally of the valve assembly and through which the chamber 17 may alo be ventilated.

The outer and inner edges 19, 20 of the annular V-shaped spring member composed of the springs 15 and 16 are supported on the valve housing in the axial as well as in the radial direction. The annular member 15, 16 is arranged in such a way that the vertex of its V-shaped configuration is directed toward the chamber 17 when the chamber 17 is not under fluid pressure, with this condition being depicted in FIG. 2.

For supporting the edges of the springs 15 and 16 which face each other, the valve seat ring is provided with a circumferential ledge 21 having a T-shaped cross sectional configuration. The edges of the springs 15 and 16 rest on the shoulders of the head portion of the T-shaped ledge 21. In order to effect sealing of the chamber 17 relative to the inner portions of the valve assembly, the annular spring member 15, 16 is provided, on its side facing the chamber 17, with at least one sealing membrane 22 having edges which are soldered or welded to the housing or to the T-shaped ring 21. A thin-walled element may be used for the membrane 22 since this membrane is unilaterally supported by the ring even when the chamber 17 is fully loaded.

In the operation of the valve assembly in accordance with the present invention, the pressure chamber 17 is illustrated in the unloaded condition in FIG. 2. The annular ring member composed of the springs 15 and 16 will assume its V-shaped configuration illustrated in FIG. 2 when the pressure chamber 17 is unloaded and when no pressure is applied against the underside of the spring member and with the spring member in this position, illustrated in FIG. 2, the valve seat ring 13 will be in a position relative to the valve flap 7 which does not effect sealing engagement of the valve flap 7 with the housing.

When pressure is introduced into the chamber 17, the annular spring member 15, 16 will be flattened and its vertex will be pressed upwardly so that the valve seat ring 13 will be pressed against the valve flap 7. The membrane 22 which is soldered or welded with its edges will seal the chamber 17 relative to the inner chambers of the valve assembly. By the pressure built up in the chamber 17, the spreading force of the annular spring member 15, 16 will be overcome, on the one hand, and the closing force for the valve slide must be applied, on the other hand.

When the chamber 17 is unloaded, the springs 15 and 16 return to their original positions due to their resilient behavior and, thus, the valve aperture 12 will be unsealed.

In the embodiment illustrated, the two cupped springs 15 and 16 may be replaced with perhaps multi-layer sets of cupped springs if the required restoring forces should make this necessary. This would depend on the size of the valve slide and also upon the type of use intended. In the illustrated construction, as well as in a construction which utilizes multi-layered cupped springs, the adjusting mechanism for the valve seat ring should be constructed in an extremely compact manner so that the valve slides will have shorter structural lengths.

In the embodiment illustrated and described, the chamber 17 is sealed relative to the inner chambers of the valve assembly by means of a thin, extremely resilient member 22 which is soldered with its edges relative to the valve housing. This membrane may be constructed with very thin walls and, thus, is very resilient because it always rests against the cupped springs and is supported by the cupped springs when the chamber 17 is unloaded so that the membrane may assume merely a sealing function. It would also be basically possible to directly seal the edges of the cupped springs 15 and 16 relative to the valve housing, for example, by means of inserted sealing ledges. Of course, if elastic soldering means should be available, it is possible that the edges of the cupped springs 15 and 16 could themselves be soldered to the respective housing components. In any case, the cupped springs 15 and 16 may have either the same or different widths.

While a specific embodiment of the invention has been shown and described in detail to illustrate the application of the inventive principles, it will be understood that the invention may be embodied otherwise without departing from such principles.

What is claimed is:

1. A pipe valve assembly particularly for controlling flow in pipes for high vacuum installations comprising: a housing defining a flow aperture, a valve member adapted to be moved between a first position for closing said aperture and a second position for opening said aperture, a valve seat ring arranged coaxially with said aperture and adapted to be moved axially relative thereto to a sealing position to press said valve member against said housing to seal said aperture when said valve member is in said first position, spring means engaging said valve seat member to urge said valve seat member away from said sealing position, and fluid pressure means including means defining together with said spring means a fluid pressure chamber on one side of said spring means for urging said valve seat ring into said sealing position, said spring means comprising a smaller diameter annular spring member and a larger diameter annular spring member arranged coaxially relative to each other and relative to said valve seat ring, with said valve seat ring being attached with the outer edge of said smaller diameter spring member and the inner edge of said larger diameter spring member, said spring means being supported in said housing at an inner edge of said smaller diameter spring member and at an outer edge of said larger diameter spring member.

2. An assembly according to claim 1 wherein said valve seat ring has formed thereon an essentially T-shaped annular mounting member having shoulders supporting said outer edge of said smaller diameter spring member and said inner edge of said larger diameter spring member.

3. An assembly according to claims 1 or 2 wherein said spring means is formed to comprise a composite annular spring member formed of said smaller and said larger diameter spring members, said composite spring member having on a side thereof facing toward said fluid pressure chamber at least one sealing membrane connected to seal said fluid pressure chamber from other portions of said valve assembly.

4. An assembly according to claim 1 wherein said valve member has a planar configuration and is movable between said first and said second positions by movement within the plane defined by its planar configuration.

* * * * *